(12) United States Patent
Li et al.

(10) Patent No.: US 12,407,899 B2
(45) Date of Patent: Sep. 2, 2025

(54) HOTSPOT LIST DISPLAY METHOD AND APPARATUS, ELECTRONIC DEVICE, AND STORAGE MEDIUM

(71) Applicant: BEIJING ZITIAO NETWORK TECHNOLOGY CO., LTD., Beijing (CN)

(72) Inventors: Zhuang Li, Beijing (CN); Xiaolu Wang, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/148,516

(22) Filed: Dec. 30, 2022

(65) Prior Publication Data

US 2023/0140948 A1 May 11, 2023

Related U.S. Application Data

(63) Continuation of application No. PCT/CN2021/128789, filed on Nov. 4, 2021.

(30) Foreign Application Priority Data

Nov. 11, 2020 (CN) .......................... 202011255845.7

(51) Int. Cl.
*H04N 21/442* (2011.01)
*H04N 21/431* (2011.01)
*H04N 21/482* (2011.01)

(52) U.S. Cl.
CPC ... *H04N 21/44222* (2013.01); *H04N 21/4316* (2013.01); *H04N 21/4825* (2013.01); *H04N 21/44204* (2013.01)

(58) Field of Classification Search
CPC ......... H04N 21/44222; H04N 21/4316; H04N 21/4825; H04N 21/44204
See application file for complete search history.

(56) References Cited

U.S. PATENT DOCUMENTS

| 9,952,742 B2* | 4/2018 | Plesur .................. G06F 3/0485 |
| 2010/0272420 A1* | 10/2010 | Soohoo .............. H04N 21/8455 386/E5.003 |

(Continued)

FOREIGN PATENT DOCUMENTS

| CN | 103067747 A | 4/2013 |
| CN | 103761228 A | 4/2014 |

(Continued)

OTHER PUBLICATIONS

International Search Report issued Jan. 12, 2022 in International Application No. PCT/CN2021/128789, with English translation (5 pages).

(Continued)

*Primary Examiner* — Nathan J Flynn
*Assistant Examiner* — Christine A Kurien

(57) ABSTRACT

Provided are a trending list display method and apparatus, an electronic device, and a storage medium. The method includes displaying a target video in a first video player interface; receiving a first slide instruction on the first video player interface, where the first slide instruction is used for switching current content of the first video player interface; and in response to the first slide instruction satisfying a trigger condition for displaying a trending list, displaying a preset video of the trending list on the first video player interface, displaying the trending list in a layer on the preset video, and displaying video properties of multiple trending videos in the trending list.

14 Claims, 7 Drawing Sheets

(56) References Cited

U.S. PATENT DOCUMENTS

| | | |
|---|---|---|
| 2011/0288912 A1 | 11/2011 | McCrea et al. |
| 2013/0291037 A1 | 10/2013 | Im et al. |
| 2014/0244751 A1 | 8/2014 | Tseng |
| 2016/0300243 A1* | 10/2016 | Yu .................. G06Q 30/0282 |
| 2019/0342616 A1* | 11/2019 | Domm .................. G06Q 50/01 |
| 2021/0234909 A1* | 7/2021 | Shortt .................. H04L 65/612 |

FOREIGN PATENT DOCUMENTS

| | | | | |
|---|---|---|---|---|
| CN | 106339894 A | | 1/2017 | |
| CN | 106488252 A | | 3/2017 | |
| CN | 108228040 A | * | 6/2018 | ........... G06F 3/0483 |
| CN | 108744514 A | | 11/2018 | |
| CN | 108989297 A | | 12/2018 | |
| CN | 109120981 A | | 1/2019 | |
| CN | 109600656 A | | 4/2019 | |
| CN | 110275741 A | | 9/2019 | |
| CN | 111914193 A | | 11/2020 | |
| CN | 112423122 A | | 2/2021 | |
| KR | 20180019235 A | | 2/2018 | |
| WO | 2011063122 A1 | | 5/2011 | |
| WO | 2019183997 A1 | | 10/2019 | |
| WO | 2020057327 A1 | | 3/2020 | |

OTHER PUBLICATIONS

First Office Action issued Feb. 14, 2022 in Chinese Application No. 202011255845.7, with English translation (12 pages).

EP Search Report dated Nov. 10, 2023 in EP Appl. No. 21891038.8 (4 pages).

Written Opinion for International Application No. PCT/CN2021/128789, mailed Jan. 12, 2022, 08 Pages.

* cited by examiner

HOTSPOT LIST DISPLAY METHOD AND APPARATUS, ELECTRONIC DEVICE, AND STORAGE MEDIUM

CROSS REFERENCE TO RELATED APPLICATIONS

This is a Continuation Application of International Patent Application No. PCT/CN2021/128789, filed on Nov. 4, 2021, which is based on and claims priority to Chinese Patent Application No. 202011255845.7 filed with the China National Intellectual Property Administration (CNIPA) on Nov. 11, 2020, disclosures of which are incorporated herein by reference in their entireties.

TECHNICAL FIELD

The present disclosure relates to the field of computer technology, for example, a trending list display method and apparatus, an electronic device, and a storage medium.

BACKGROUND

A short-video play application tends to provide a recommendation page to a user. The user can view, on the recommendation page, a video recommended by the short-video play application and switch, by sliding upward or downward, the video played on the recommendation page.

However, the related art only allows the user to slide upward or downward on the recommendation page to switch between videos to view the videos recommended by the short-video play application and cannot systematically learn about information about viewing of the video by other users of the short-video play application.

SUMMARY

The present disclosure provides a trending list display method and apparatus, an electronic device, and a storage medium so that a user can learn about current trending videos.

The present disclosure provides a trending list display method.

The method includes displaying a target video in a first video player interface; receiving a first slide instruction on the first video player interface, where the first slide instruction is used for switching current content of the first video player interface; and in response to the first slide instruction satisfying a trigger condition for displaying a trending list, displaying a preset video of the trending list on the first video player interface, displaying the trending list in a layer on the preset video, and displaying video properties of a plurality of trending videos in the trending list.

The present disclosure also provides a trending list display apparatus. The apparatus includes a target video play module, a slide instruction receiving module, and a trending list display module.

The target video play module is configured to play a target video in a first video player interface.

The slide instruction receiving module is configured to receive a first slide instruction on the first video player interface, where the first slide instruction is used for switching the current content of the first video player interface.

The trending list display module is configured to, in response to the first slide instruction satisfying a trigger condition for displaying a trending list, play a preset video of the trending list on the first video player interface, display the trending list in a layer on the preset video, and display video properties of a plurality of trending videos in the trending list.

The present disclosure also provides an electronic device. The electronic device includes at least one processor and a memory configured to store at least one program.

The at least one processor is configured to perform the preceding trending list display method when executing the at least one program.

The present disclosure also provides a computer-readable storage medium. The storage medium stores a computer program which, when executed by a processor, causes the processor to perform the preceding trending list display method.

DETAILED DESCRIPTION

Embodiments of the present disclosure are described hereinafter with reference to the drawings. The drawings illustrate some embodiments of the present disclosure, but the present disclosure may be implemented in various manners and should not be limited to the embodiments set forth herein. These embodiments are provided for more thorough and complete understanding of the present disclosure. The drawings and the embodiments of the present disclosure are only for illustrative purposes.

The various steps recited in method embodiments of the present disclosure may be performed in a different order and/or in parallel. Additionally, the method embodiments may include additional steps and/or omit the steps shown. The scope of the present disclosure is not limited in this respect.

The term "includes" or its variant used herein means "includes, but is not limited to". The term "based on" used herein means "at least partially based on". The term "an embodiment" used herein means "at least one embodiment". The term "another embodiment" used herein means "at least another embodiment". The term "some embodiments" used herein means "at least some embodiments". Related definitions of other terms are given in the description hereinafter.

Concepts such as "first" and "second" in the present disclosure are intended to distinguish between apparatuses, modules, or units and are not intended to limit the order of or interdependence between functions performed by these apparatuses, modules, or units.

References to modifications of "one" or "a plurality" mentioned in the present disclosure are intended to be illustrative and not limiting; those skilled in the art should understand that "one" or "a plurality" should be construed as "one or more" unless clearly expressed in the context.

The names of messages or information exchanged between apparatuses in embodiments of the present disclosure are illustrative and not to limit the scope of the messages or information.

Figure 1:
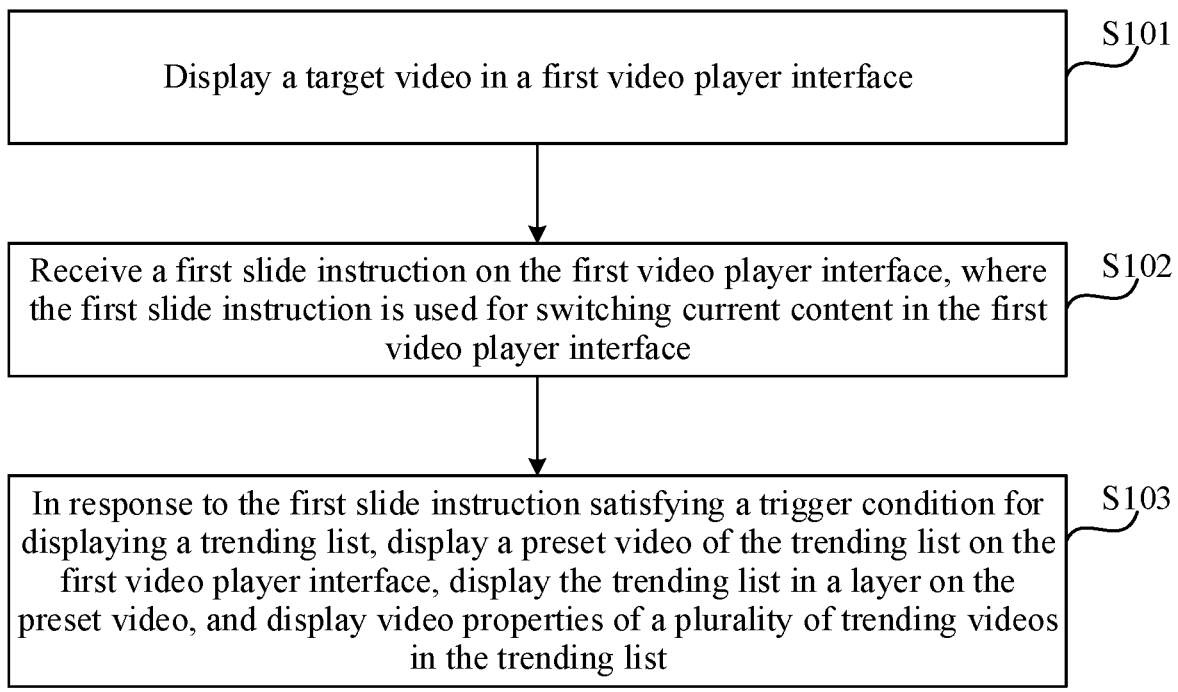
FIG. 1 is a flowchart of a trending list display method according to an embodiment of the present disclosure.

FIG. 1 is a flowchart of a trending list display method according to an embodiment of the present disclosure. The method may be performed by a trending list display apparatus. The apparatus may be implemented in software and/or hardware and may be configured in an electronic device such as a mobile phone or a tablet computer. The trending list display method of this embodiment of the present disclosure is applicable to the scenario where a trending list is displayed when a user is viewing videos. As shown in FIG. 1, the trending list display method of this embodiment may include the steps below.

In S101, a target video is played in a first video player interface.

The first video player interface may be any video player interface in which a video is switched through a slide instruction. The first video player interface may be, for example, a Nearby page for displaying videos published by local users in a video play application, a Follow page for displaying videos published by followed users in a video play application, or a Recommend page for displaying videos recommended by a video play application. The target video may be construed as a video originally played on the first video player interface when the first slide instruction is received, that is, a video played on the first video player interface before the current content of the first video player interface is switched through the first slide instruction.

Illustratively, the user may control the electronic device to switch the current interface to the first video player interface and view a video on the first video player interface.

In S102, a first slide instruction on the first video player interface is received, where the first slide instruction is used for switching the current content of the first video player interface.

The first slide instruction may be any slide instruction performed on the first video player interface to cause switching of the current content of the first video player interface. The first slide instruction may be, for example, a leftward or rightward slide instruction or an upward or downward slide instruction. By way of example, the first slide instruction described below is an upward or downward slide instruction. The current content of the first video player interface may be construed as the content currently displayed on the first video player interface. The current content of the first video player interface may be, for example, a video played on the first video player interface and/or the trending list displayed on the first video player interface. That is, the current content is the target video when the electronic device plays the target video on the first video player interface and is the trending list when the electronic device displays the trending list on the first video player interface.

In this embodiment, the user may switch the current content of the first video player interface by sliding upward or downward. For example, the user may instruct the electronic device to switch the current content of the first video player interface to the next display content in the video stream of the first video player interface by sliding upward on the first video player interface and instruct the electronic device to switch the current content of the first video player interface to the previous played content in the video stream of the first video player interface by sliding downward on the first video player interface. Accordingly, the electronic device may determine that the first slide instruction is received when detecting that the user slides upward or downward on the first video player interface.

In S103, in response to the first slide instruction satisfying a trigger condition for displaying the trending list, a preset video of the trending list is played on the first video player interface, the trending list is displayed in a layer on the preset video, and video properties of multiple trending videos are displayed in the trending list.

Figure 2:
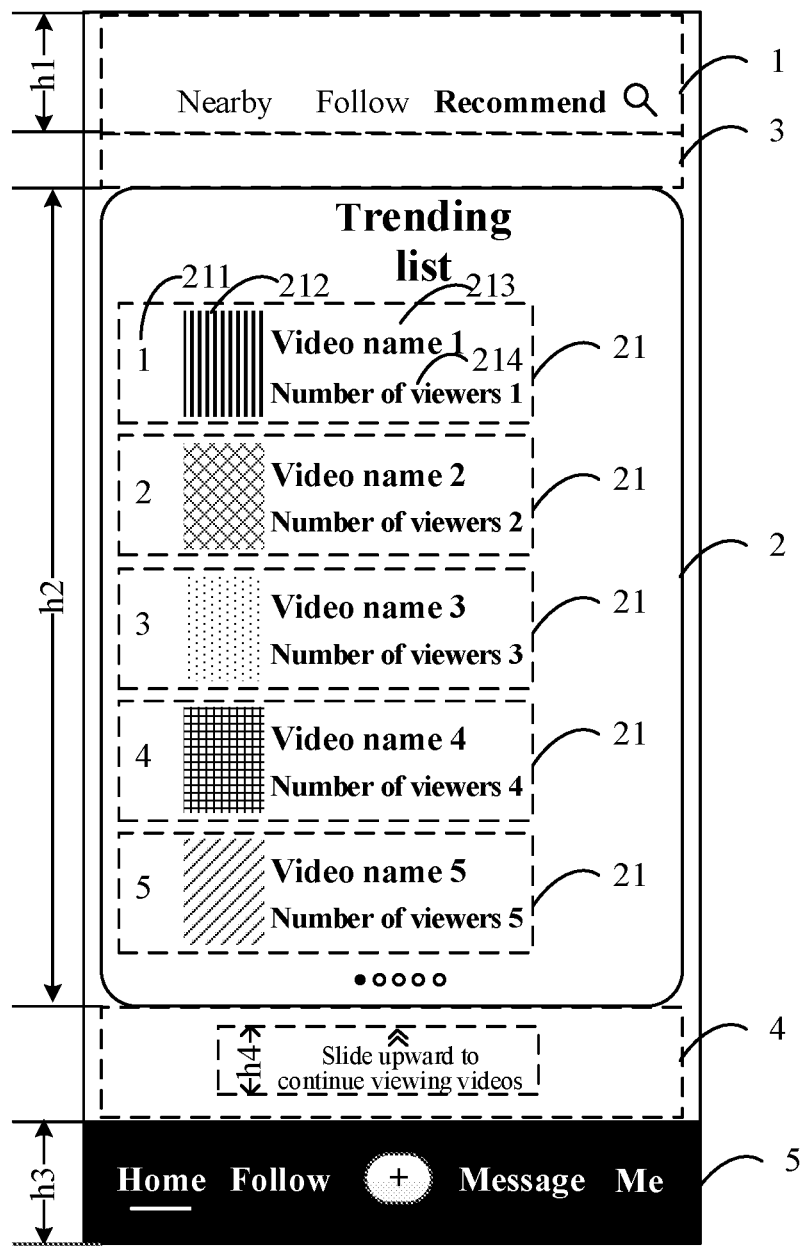
FIG. 2 is a diagram of a trending list according to an embodiment of the present disclosure.

A trending video may be a video having much popularity. The popularity of the video may be calculated from the following parameters of the video: the number of times of being viewed, the number of times of being shared, the number of times of being added to favorites, the number of times of being commented on, and/or the number of times of being liked. Accordingly, the trending list may be construed as a list of recorded trending videos. As shown in FIG. 2, the trending list includes video properties 21 of multiple trending videos. A video property may be construed as video information of a trending video. The video property includes at least one of the following: the popularity rank 211 of the trending video, the cover page 212 of the trending video, the video name 213 of the trending video, or the number 214 of people who are viewing the trending video. The video properties 21 of the multiple trending videos may be ranked in order of popularity from high to low in the trending list. The trending list may be displayed in the first video player interface, that is, in the layer in which the first video player interface is located, or may be displayed in a floating window on the first video player interface. The preset video of the trending list may be a preshot video containing audio or a preset animation effect carrying a corresponding audio effect. The preset video may be set by a developer. If the user does not instruct the electronic device to switch the trending list on the first video player interface to another video after the preset video completes being played, the preset video may be played again.

In this step, the trigger condition for displaying the trending list may be set by the developer according to requirements. For example, the display condition of the trending list may be set as follows: The trending list is displayed in a preset time period (for example, 7:00-8:00 each day and/or 20:00-21:00 each day), and/or the trending list is displayed when the user performs the first slide instruction on the first video player interface for the nth (n is a positive integer) time. The trending list display method of this embodiment may also include, in response to determining that the first slide instruction is the ith first slide instruction in a preset time period or that the next to-be-displayed content located in the video stream of the first video player interface and corresponding to the first slide instruction is the trending list, determining that the first slide instruction satisfies the trigger condition for displaying the trending list, where i is a positive integer.

If the display condition of the trending list is to perform the ith first slide instruction in the preset time period, when the trending list is displayed on the first video player interface, the trending list may be inserted between the target video in the video stream of the first video player interface and the next video of the target video or between the target video and the previous video of the target video. For example, the trending list may be inserted between the target video in the video stream of the first video player interface and the next video of the target video when the slide instruction is upward and may be inserted between the target video and the previous video of the target video when the slide instruction is downward. In this manner, after switching the trending list on the first video player interface to another video in the video stream of the first video player interface, the user can switch back to the trending list through the first slide instruction and view the trending list again. One or more trending lists may be inserted in the video stream of the first video player interface. For example, the trending list may be inserted between only the nth video in the video stream and the (n+1)th video in the video stream or may be inserted once every m (m is a positive integer) videos in the video stream. This is not limited in this embodiment.

The electronic device plays the target video on the first video player interface. When wanting to switch the target video played on the first video player interface, the user slides upward or downward on the first video player interface. Accordingly, when detecting that the user slides upward or downward on the first video player interface, the electronic device determines that the first slide instruction is received and determines whether the current condition satisfies the display condition of the trending list. If the current condition conforms to the display condition of the trending list, the preset video of the trending list is played on the first video player interface, the trending list is displayed in a layer on the preset video, and video properties of multiple trending videos are displayed in the trending list. If the current condition does not conform to the display condition of the trending list, the video located in the video stream and corresponding to the slide instruction of the user is played on the first video player interface. For example, the next video of the target video in the video stream is played on the first video player interface when the user slide upward, and the previous video of the target video in the video stream is played on the first video player interface when the user slide downward.

In this embodiment, in order that viewing of the trending list is not affected when the preset video is played and that the display effect of the trending list can be improved, the preset video played when the trending list is displayed may contain a blurred area. That is, each video frame of the preset video contains a blurred area, and the display position of the blurred area on the first video player interface is the same as the display position of the trending list on the first video player interface. The blurred area may be a Gaussian blurred area or may be obtained by being processed in other manners. The position of the blurred area in each video frame may correspond to the display position of the trending list. That is, when the preset video is played on the first video player interface, the position coordinates of the blurred area in each video frame of the preset video on the first video player interface are the same as the position coordinates of the trending list on the first video player interface. In this manner, the video frame inside the display area corresponding to the trending list can be displayed in a blurred manner, and the video frame outside the display area corresponding to the trending list can be displayed clearly.

In the manner below, the preset video of the trending list may be played on the first video player interface, and the trending list may be displayed in a layer on the preset video.

A. The second target height of the trending list required when a target number of video properties are displayed in the trending list is determined according to the preset display height of each video property.

The second target height may be construed as the height of the trending list required when a target number of video properties are displayed in the trending list.

In this embodiment, the second target height of the trending list required when a target number of video properties are displayed in the trending list may be calculated from the sum of the heights of the sub-display areas corresponding to characters in the trending list and the heights of the sub-display areas corresponding to video properties of the trending list. For example, assuming that a list title "trending list" is displayed on the top of the trending list, a page prompt is displayed on the bottom of the trending list, the height of the first sub-display area corresponding to the list title is h21, the height of the second sub-display area corresponding to the page prompt is h22, and the height of the third sub-display area corresponding to each video property is h23, then when a target number of video properties (for example, m video properties) are displayed in the trending list, the height hm of the trending list is h21+h22+m×h23.

B. The height of a first blank area and the height of a second blank area are adjusted separately such that the display area of the original list is adjusted to the display area of a target list. The height of the display area of the target list is the target height.

The blank area may be construed as an area used for displaying video properties of trending videos, located in the first video player interface, and other than the display area of the original list including an original number of video properties of the trending list. The blank area may include only the blank area located in the first video player interface and below the display area of the trending list or may include both the blank area located in the first video player interface and below the display area of the trending list and the blank area located in the first video player interface and above the display area of the trending list. In this embodiment, the blank area includes a first blank area located in the first video player interface and above the display area of the trending list and a second blank area located in the first video player interface and below the display area of the trending list. FIG. 2 shows the first blank area 3 above the display area 2 of the original list and the second blank area 4 below the display area 2 of the original list.

In this embodiment, the height of the first blank area and the height of the second blank area may be adjusted according to the same or different proportions as long as the height of the display area of the original list can be adjusted to the second target height and as long as characters that require to be displayed in the first blank area and the second blank area can be completely displayed in the first blank area and the second blank area after adjustment. When the trending list is displayed, the ratio of the height of the first blank area on the first video player interface to the height of the second blank area on the first video player interface may be set to 3/7. Accordingly, after the sum of the height of the first blank area and the height of the second blank area is calculated, the height of the first blank area and the height of the second blank area before adjustment can be calculated based on the set ratio.

For example, the height of the first blank area and the height of the second blank area may be adjusted according to the same proportion. When the display area of the original list is adjusted to the display area of the target list, the following instructions may be performed: The difference value between the second target height and the height of the display area of the original list is calculated. The sum of the height of the first blank area and the height of the second blank area before adjustment is calculated. The ratio of the difference value to the sum is calculated and used as the target proportion. The first blank area and the second blank area are each reduced by the target proportion. The product of the height of the first blank area and the target proportion is calculated and used as a first to-be-adjusted height. The product of the height of the second blank area and the target proportion is calculated and used as a second to-be-adjusted height. The lower boundary of the first blank area is shifted upward by the first to-be-adjusted height. The upper boundary of the second blank area is shifted downward by the second to-be-adjusted height. The adjusted lower boundary of the first blank area is determined as the upper boundary of the display area of the target list. The upper boundary of the adjusted second blank area is determined as the lower boundary of the display area of the target list. The left boundary and the right boundary of the display area of the original list are determined as the left boundary and the right boundary of the display area of the target list respectively. In this manner, the target display area is obtained.

Illustratively, assuming that the height of the first blank area before adjustment is h41, the height of the second blank area before adjustment is h42, the height of the display area of the original list is h2, and the second target height is h5, then the lower boundary of the first blank area requires to be shifted upward by a distance (that is, the first to-be-adjusted height) of L1, where L1=h41(h5−h2)/(h41+h42), and the upper boundary of the second blank area requires to be shifted downward by a distance (that is, the second to-be-adjusted height) of L2, where L2=h42 (h5−h2)/(h41+h42).

If other characters are displayed in the first blank area/the second blank area, then after the position of the lower boundary of the first blank area and the position of the upper boundary of the second blank area are adjusted, the positions of other characters displayed in the first blank area/the second blank area may be adjusted such that other characters in the first blank area/the second blank area can be displayed normally in the first blank area/the second blank area after adjustment.

C. Each original video frame of the preset background video of the trending list is scaled such that the blurred area in each original video frame has the same height and/or width as the display area of the target list.

In this embodiment, a blurred area may be preset in each original video frame of the preset background video of the trending list, and the blurred area in each original video frame is adjusted such that the blurred area has the same height and/or width as the display area of the target list. In this manner, when the trending list is displayed, a blurred frame is displayed in the background video displayed in the display area of the trending list (that is, the display area of the target list) so that viewing of the trending list is not affected when the background video is played. The blurred area may be construed as an area in which the original video frame is blurred. The original video frame may be blurred in different manners according to requirements. For example, by using the Gaussian blurring technique, each video frame not containing a blurred area in the original background video may be processed as a video frame containing a blurred area.

In this step, for each original video frame in the preset background video, it is feasible to make the blurred area in an original video frame have the same height and width as the display area of the target list by scaling the height of the original video frame and the width of the original video frame according to different proportions; or it is feasible to make the blurred area in an original video frame have the same height and width as the display area of the target list by scaling the height of the original video frame and the width of the original video frame according to the same proportion. This is not limited in this embodiment.

In this embodiment, to ensure the frame display effect in the preset background video, the height of the original video frame and the width of the original video frame may be scaled according to the same proportion. In this case, for each original video frame in the preset background video, it is feasible to make an original video frame have the same height as the display area of the target list by scaling the height of the original video frame and the width of the original video frame according to the same proportion, regardless of the shifting direction of a target object in the preset background video; or for each original video frame in the preset background video, it is feasible to, when the shifting direction of a target object in the preset background video is considered, perform the following instructions: at the time when the target object is mainly shifted out of the blurred area from the upper or lower boundary of the blurred area, the height of the original video frame and the width of the original video frame are scaled according to the same proportion until the blurred area has the same height as the display area of the target list, and at the time when the target object is mainly shifted out of the blurred area from the left or right boundary of the blurred area, the height of the original video frame and the width of the original video frame are scaled according to the same proportion until the blurred area has the same width as the display area of the target list; in this manner, the display effect of the trending list is improved when the target object is shifted out of the display area of the target list, that is, when blurred display of the target object is changed to clear display of the target object.

D. Each scaled original video frame is clipped into a target video frame conforming to the dimension of the first video player interface so that a target background video corresponding to the preset background video.

Illustratively, each scaled original video frame may be placed at an area where the upper boundary and the lower boundary (or the left boundary and the right boundary) of the blurred area in each original video frame overlap the upper boundary and the lower boundary (or the left boundary and the right boundary) of the display area of the target list respectively; and with the boundary of the video play area on the first video player interface as a clipping line, each original video frame is clipped into a target video frame whose dimension conforms to the dimension of the video play area on the first video player interface, and a video composed of multiple target video frames is determined as a target background video. The video play area on the first video player interface may be construed as an area located on the first video player interface and used for displaying a video image in the played video. This area may be all or part of the first video player interface. For example, when the first video player interface does not contain an area that cannot be used for displaying a video frame in the played video, the boundary of the first video player interface may be determined as the boundary of the video play area; and when the first video player interface contains an area (for example, a bottom control display area 5 shown in FIG. 2) that cannot be used for displaying a video frame in the played video, an area located on the first video player interface and other than the area that cannot be used for displaying a video frame in the played video may be determined as the video play area.

E. The target background video is played on the first video player interface. The trending list is displayed in a floating window in the display area of the target list.

In an embodiment, when the first slide instruction is received again, the trending list is stopped from being displayed, and a video located in the video stream and corresponding to the first slide instruction received again is played on the first video player interface.

In this embodiment, the user may switch, through the first slide instruction, the target video played on the first video player interface to another video or trending list and may switch, through the first slide instruction, the trending list displayed on the first video player interface to another video.

When the user wants to continue viewing the video, that is, when the user wants to switch the trending list on the first video player interface to a video, the first slide instruction may be performed again. Accordingly, the electronic device may determine again whether the current condition satisfies the display condition of the trending list when the electronic device receives the first slide instruction again; and stop displaying the trending list on the first video player interface when the current condition does not satisfy the display condition of the trending list and play, on the first video player interface, the video corresponding to the first slide instruction performed again. For example, the electronic device may play the previous video or the next video adjacent to the trending list in the video stream on the first video player interface based on the slide direction of the first slide instruction when the trending list is located in the video stream of the first video player interface; and the electronic device may play the previous video or the next video adjacent to the target video in the video stream on the first video player interface based on the slide direction of the first slide instruction when the trending list is not located in the video stream of the first video player interface.

In the trending list display method of this embodiment, a target video is played in a first video player interface; a first slide instruction on the first video player interface is received, where the first slide instruction is used for switching the current content of the first video player interface; and in response to the first slide instruction satisfying a trigger condition for displaying the trending list, a preset video of the trending list is played on the first video player interface, the trending list is displayed in a layer on the preset video, and video properties of multiple trending videos are displayed in the trending list. In the solution of this embodiment, the trending list is displayed when a user switches a video, and the preset video is played in a layer under the trending list. The trending list is displayed so that the user can learn about information about trending videos and pay more attention to trending videos. Moreover, the first slide instruction enables video switching so that the trending list can be displayed in a pleasant manner, and the user experience can be improved.

Figure 3:
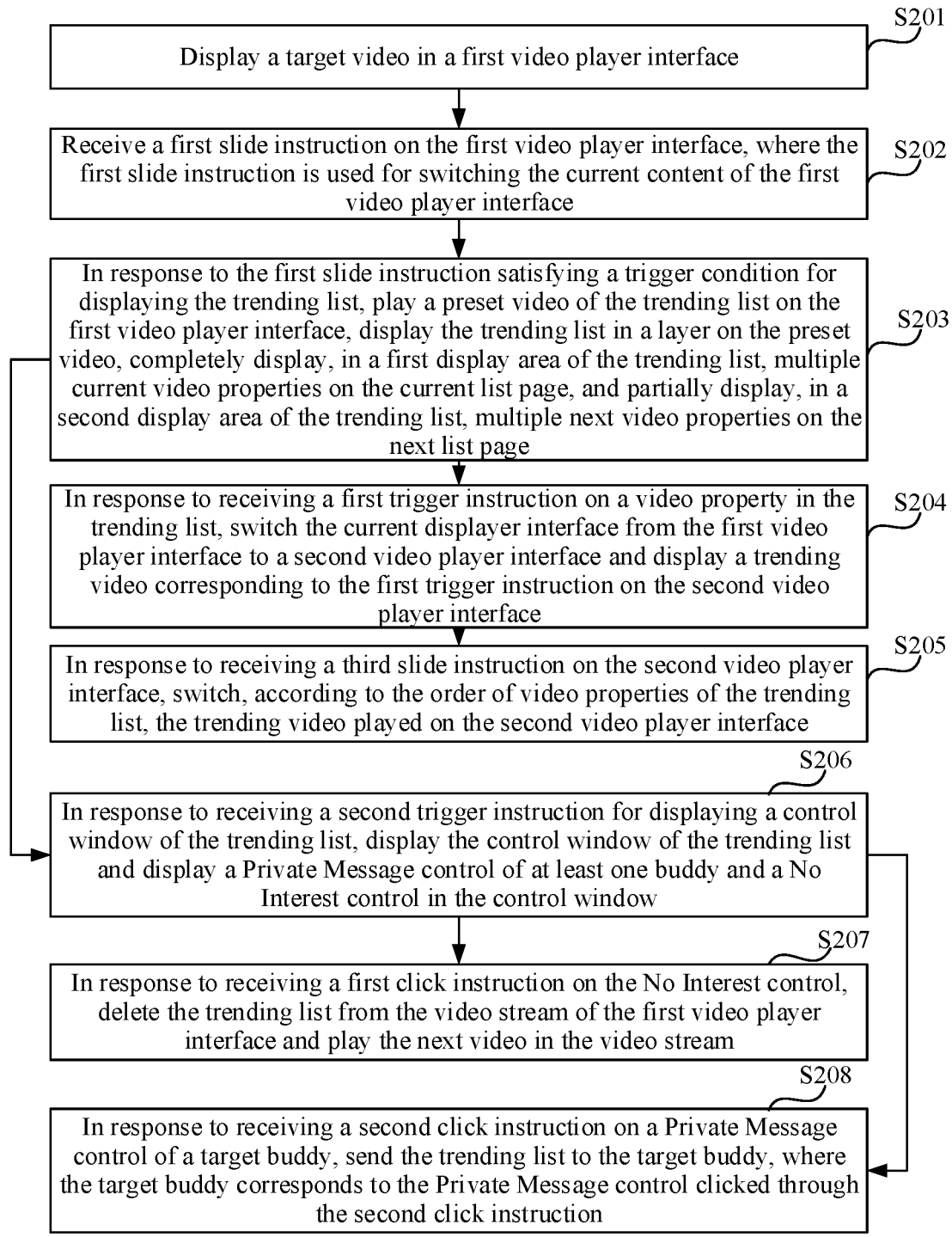
FIG. 3 is a flowchart of another trending list display method according to an embodiment of the present disclosure.

FIG. 3 is a flowchart of another trending list display method according to an embodiment of the present disclosure. The solution of this embodiment may be combined with one or more optional solutions of the preceding embodiments. Optionally, the trending list includes multiple list pages, and displaying video properties of the multiple trending videos in the trending list includes completely displaying, in a first display area of the trending list, multiple current video properties on the current list page and partially displaying, in a second display area of the trending list, multiple next video properties on the next list page.

Optionally, the trending list display method of this embodiment also includes, in response to receiving a first trigger instruction on a video property in the trending list, switching the current interface from the first video player interface to a second video player interface and displaying a trending video corresponding to the first trigger instruction on the second video player interface.

Optionally, the trending list display method of this embodiment also includes, in response to receiving a third slide instruction on the second video player interface, switching, according to the order of video properties of the trending list, the trending video played on the second video player interface.

Optionally, the trending list display method of this embodiment also includes, in response to receiving a second trigger instruction for displaying a control window of the trending list, displaying the control window of the trending list and displaying a Private Message control of at least one buddy and a No Interest control in the control window; in response to receiving a first click instruction on the No Interest control, deleting the trending list from the video stream of the first video player interface and displaying the next video in the video stream; in response to receiving a second click instruction on a Private Message control of a target buddy, sending the trending list to the target buddy, where the target buddy corresponds to the Private Message control clicked through the second click instruction.

Accordingly, as shown in FIG. 3, the trending list display method of this embodiment may include the steps below.

In S201, a target video is played in a first video player interface.

In S202, a first slide instruction on the first video player interface is received, where the first slide instruction is used for switching the current content of the first video player interface.

In S203, in response to the first slide instruction satisfying a trigger condition for displaying the trending list, a preset video of the trending list is played on the first video player interface, the trending list is displayed in a layer on the preset video, multiple current video properties on the current list page are completely displayed in a first display area of the trending list, multiple next video properties on the next list page are partially displayed in a second display area of the trending list, and S204 or S206 is performed, where the trending list includes multiple list pages.

The current list page may be construed as the list page currently displayed in the trending list. The first display area may be construed as an area located in the trending list and used for displaying multiple current video properties on the current list page. The second display area may be construed as an area located in the trending list and used for displaying multiple next video properties on the next list page of the current list page. A current video property may be a video property on the current list page. A next video property may be construed as a video property on the next list page of the current list page.

Figure 4:
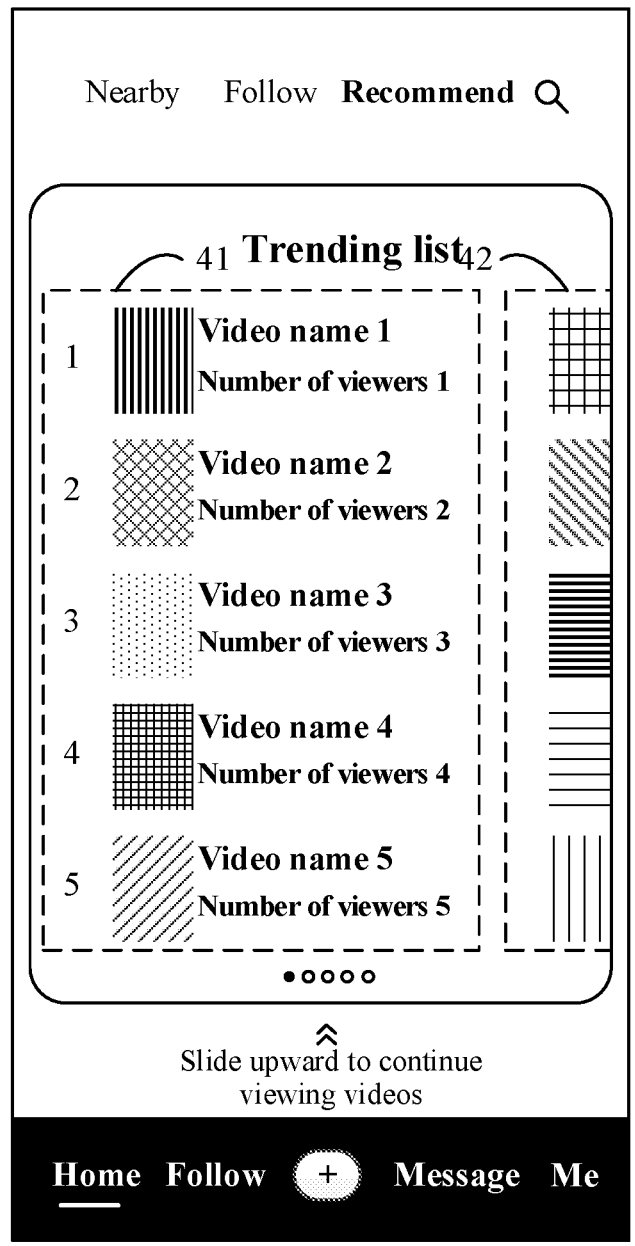
FIG. 4 is a diagram of another trending list according to an embodiment of the present disclosure.

In this embodiment, the displayed trending list may be divided into multiple displayed list pages. When displaying multiple video properties in the trending list, the electronic device may display video properties on the next list page in addition to video properties on the current list page so that the user can view the trending list more easily. In this case, as shown in FIG. 4, the trending list may include a first display area 41 and a second display area 42. The width of the second display area 42 may be less than the width of the first display area 41. Accordingly, when displaying multiple video properties in the trending list, the electronic device may completely display multiple current video properties on the current list page of the trending list in the first display area 41 of the trending list and display part of the content of multiple next video properties on the next list page of the trending list in the second display area 42 of the trending list. For example, the electronic device may completely or partially display video cover pages or video names of multiple next video properties in the second display area 42. By way of example, in FIG. 4, video cover pages of multiple next video properties are partially displayed in the second display area 42.

In this step, the electronic device may display a fixed number of video properties on each list page of the trending list. For example, the number of video properties included on each list page may be preset. When displaying video properties on each list page of the trending list, the electronic device may adjust the size of a character in each video property and the size of the cover page in each video property according to this number and the screen dimension of the electronic device. That is, the number of video properties included on each list page is fixed. When the screen of the electronic device is large, the electronic device may display a large character and a large video cover page in the video property. When the screen of the electronic device is small, the electronic device may display a small character and a small video cover page in the video property.

Additionally, the electronic device may also display video properties fixed in size on each list page of the trending list. For example, the size of a character in each video property and the size of the cover page in each video property may be preset. Accordingly, when displaying video properties on each list page of the trending list, the electronic device may adjust the number of video properties on each list page according to the sizes and the screen dimension of the electronic device. That is, the size of each video property displayed on each list page is fixed. When the screen of the electronic device is large, a large number of video properties (for example, 5 or 6 video properties) may be displayed on each list page. When the screen of the electronic device is small, a small number of video properties (for example, 4 or 3 video properties) may be displayed on each list page. Before displaying video properties of the multiple trending videos in the trending list, the method also includes acquiring screen dimension information of the electronic device; and determining a target number of to-be-displayed video properties on each list page of the trending list according to the screen dimension information and determining the to-be-displayed video properties on each list page according to the target number. The screen dimension information of the electronic device may be determined according to the device model information of the electronic device. The device model information may be obtained from the device information of the electronic device.

In this embodiment, the screen dimension information of the electronic device may be the screen height of the electronic device. The electronic device may use the screen height as the page height of the first video player interface; determine a blank area on the first video player interface according to the page height and the original height of the trending list used when an original number of video properties of the trending list are completely displayed; and adjust the original number according to the blank area to obtain a target number of to-be-displayed video properties of the trending list.

The original number may be construed as the preset default display number of video properties of the trending list. The original number may be preset by an application developer or determined according to the screen type of the electronic device. That is, the application developer may preset a universal default display number of video properties for electronic devices having different screen types or may set different default display numbers of video properties for electronic device having different screen types. This is not limited in this embodiment. The blank area may be construed as an area used for displaying video properties of trending videos, located in the first video player interface, and other than the display area of the original list including an original number of video properties of the trending list. The blank area may include only the blank area located in the first video player interface and below the display area of the trending list or may include both the blank area located in the first video player interface and below the display area of the trending list and the blank area located in the first video player interface and above the display area of the trending list. In this embodiment, the blank area includes a first blank area located in the first video player interface and above the display area of the trending list and a second blank area located in the first video player interface and below the display area of the trending list.

In this embodiment, the blank area may be determined according to the page height information and the original height of the trending list used when an original number of video properties of the trending list are completely displayed. As shown in FIG. 2, the original height of the trending list used when an original number of video properties of the trending list are completely displayed may be construed as the height h2 of the display area 2 of the original list used when the trending list containing an original number of video properties is completely displayed on the first video player interface. The height h2 of the display area 2 of the original list may be calculated from the sum of the heights of the sub-display areas corresponding to characters in the trending list and the heights of the sub-display areas corresponding to video properties of the trending list. For example, assuming that a list title "trending list" is displayed on the top of the trending list, a page prompt is displayed on the bottom of the trending list, and an original number of video properties (assumed to be n video properties, for example, 5 video properties as shown in FIG. 2) are displayed in the middle of the trending list and assuming that the height of the first sub-display area corresponding to the list title is h21, the height of the second sub-display area corresponding to the page prompt is h22, and the height of the third sub-display area corresponding to each video property is h23, then the height h2 of the display area 2 of the original list is h21+h22+n×h23.

In this embodiment, the original number may be adjusted according to whether a blank area exists on the first video player interface and according to a first target height of the blank area on the first video player interface. For example, when no blank area exists on the first video player interface, the original number is reduced, and when a blank area exists on the first video player interface and the height of the blank area is greater than the preset display height of a single video property, the original number is increased, so that the target number of to-be-displayed video properties of the trending list is obtained. Alternatively, the integer part of the ratio of the first target height to the preset display height of a single video property is acquired, and then the sum of the original number and the integer part is calculated and used as the target number of to-be-displayed video properties of the trending list.

Considering that the screen heights of different electronic devices generally do not differ greatly, that is, the absolute value of the difference value between the original number before adjustment and the target number after adjustment is generally not greater than 1, in this embodiment, the original number may be adjusted according to the relative sizes of the first target height and the preset display height of a single video property and the positive and negative values of the first target height so that the calculation amount required in the process of adjusting the original number is reduced. Adjusting the original number according to the blank area to obtain the target number of to-be-displayed video properties of the trending list includes acquiring the difference value between the page height and the sum of the original height and the control height of a control provided on the first video player interface using the difference value as the first target height of the blank area; if the first target height is greater than or equal to the preset display height of a single video property, incrementing the original number by 1 to obtain the target number of to-be-displayed video properties of the trending list; if the first target height is less than the preset display height of a single video property and is greater than or equal to 0, determining the original number as the target number of to-be-displayed video properties of the trending list; and if the first target height is less than 0, subtracting 1 from the original number to obtain the target number of to-be-displayed video properties of the trending list.

In this embodiment, when the electronic device completely displays an original number of video properties of the trending list, the first target height of the blank area on the first video player interface may be obtained from the difference value between the page height of the first video player interface and the sum of the control height of the display area corresponding to the control (including a character/control that requires to be displayed on the first video player interface) provided on the first video player interface and the original height of the display area of the original list of the trending list used when an original number of video properties are completely displayed. The height of the display area corresponding to the character/control that requires to be displayed on the first video player interface may be preset by the developer.

Illustratively, as shown in FIG. 2, top controls including a Nearby control for controlling the electronic device to play videos published by authors located in the same city as the user, a Follow control for controlling the electronic device to play videos published by authors followed by the user, and a Recommend control for controlling the electronic device to play videos recommended by the application are provided on the top of the first video player interface; and bottom controls including a Home control for controlling the electronic device to display the home page of the application, a Follow control for controlling the electronic device to display the Following page of the application, and a Message control for controlling the electronic device to display the message page of the application are provided on the bottom of the first video player interface. Assuming that the height of the first video player interface is H, the height of a top control display area 1 for displaying the top controls is h1, the height of the display area 2 of the original list corresponding to the trending list used when an original number of video properties are displayed is h2, and the height of a bottom control display area 5 is h3, then the total height of the first blank area 3 above the display area 2 of the original list and the second blank area 4 below the display area 2 of the original list is H−h1−h2−h3. Thus, when no character is displayed in the first blank area 3 and the second blank area 4, the first target height h of the remaining blank area can be calculated as H−h1−h2−h3. When other characters (for example, guidance information "slide upward to continue viewing videos" in the second blank area 4 of FIG. 2) are displayed in the first blank area 3 and/or the second blank area 4, assuming that the total height occupied by these characters in the first blank area 3 and/or the second blank area 4 is h4, then the first target height h of the remaining blank area on the first video player interface is H−h1−h2−h3−h4.

In this embodiment, after the original number is increased or decreased by 1, it is also feasible to use the original number at this time as the new original number and return to S102 until the first target height is less than the preset display height of a single video property and is greater than or equal to 0; and use the original number at this time as the target number to improve the display effect of the trending list on the first video player interface.

In an embodiment, the trending list display method of this embodiment may also include, in response to receiving a second slide instruction on the trending list, switching the current list page of the trending list by moving the multiple current video properties and the multiple next video properties along the slide direction of the target slide instruction; or, in response to receiving a click instruction on a video property update control in the trending list, switching the current list page of the trending list.

The second slide instruction may be construed as an instruction for instructing the electronic device to switch the current list page of the trending list. The second slide instruction may be a leftward or rightward slide instruction performed by the user in the trending list.

Figure 5:
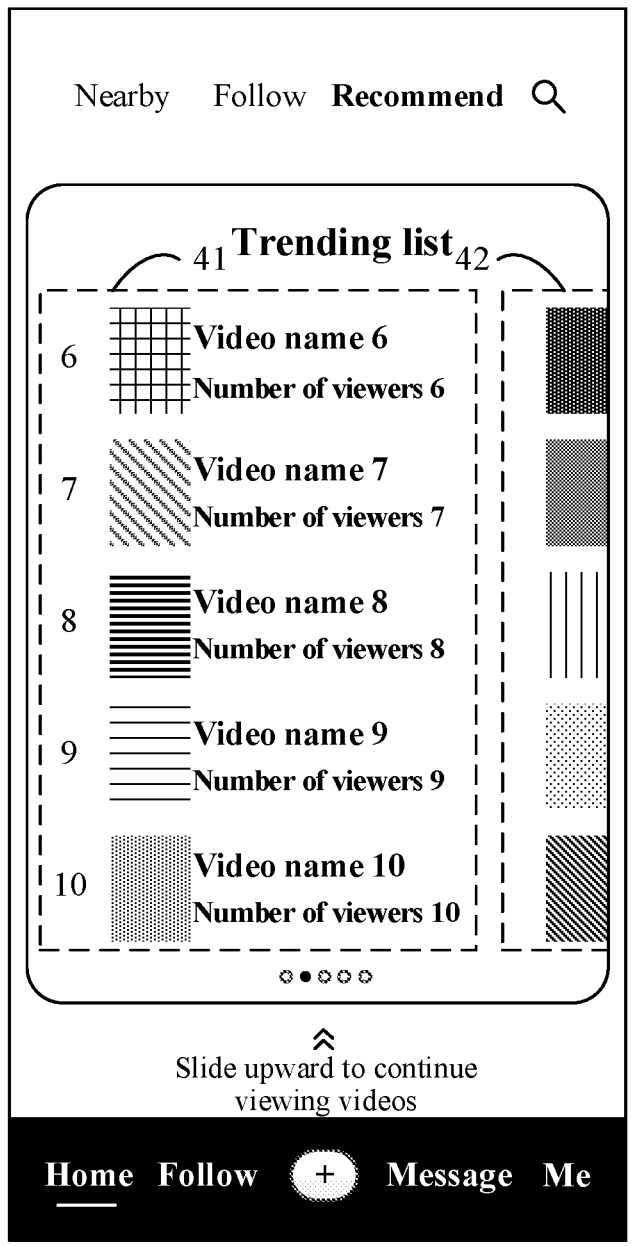
FIG. 5 is a diagram of another trending list according to an embodiment of the present disclosure.

In this embodiment, the user may switch the current list page of the trending list through a leftward or rightward slide instruction or by clicking the video property update control. When wanting to switch the current list page to the next list page, the user may slide leftward in the trending list. Accordingly, when detecting the leftward slide instruction in the trending list, the electronic device determines that the second slide instruction is received and controls multiple video properties displayed in the trending list to move leftward synchronously to switch the current list page to the next list page (see FIG. 5). When wanting to switch the current list page to the previous list page, the user may slide rightward in the trending list. Accordingly, when detecting the rightward slide instruction in the trending list, the electronic device determines that the second slide instruction is received and controls multiple video properties displayed in the trending list to move rightward synchronously to switch the current list page to the previous list page. Alternatively, when video property update controls such as a Previous Page control and a Next Page control are provided in the trending list, when wanting to switch the current list page to the next list page, the user may click the Next Page control in the trending list; accordingly, when detecting that the user clicks the Next Page control, the electronic device determines that a click instruction on a video property update control is received and switches the current list page to the next list page; and when wanting to switch the current list page to the previous list page, the user may click the Previous Page control in the trending list; accordingly, when detecting that the user clicks the Previous Page control, the electronic device determines that a click instruction on a video property update control is received and switches the current list page to the previous list page.

When displaying the trending list, the electronic device may not display the trending list by page. For example, the trending list may be configured to include only one list page. In this case, the user may update video properties on this list page by sliding leftward or rightward in the trending list or clicking a video property update control displayed in the trending list, that is, the electronic device may update video properties of the trending list when detecting that the user slides leftward or rightward in the trending list or when detecting that the user clicks the video property update control. Additionally, when the current list page is the first list page in the trending list and the user slides rightward or when the current list page is the last list page in the trending list and the user slides leftward, it is feasible to not respond to the slide instruction of the user or to switch the first video player interface to another page whose page tag is adjacent to the page tag of the first video player interface according to the page tag (for example, Nearby, Follow, or Recommend of FIG. 4) on the top of the first video player interface.

In S204, in response to receiving a first trigger instruction on a video property in the trending list, the current interface is switched from the first video player interface to a second video player interface, and a trending video corresponding to the first trigger instruction is displayed on the second video player interface.

The first trigger instruction may be used for instructing the electronic device to play the trending video corresponding to a video property displayed in the trending list. The first trigger instruction may be a click on a video property displayed in the trending list. Accordingly, the trending video corresponding to the first trigger instruction may be the trending video corresponding to a video property clicked by the first trigger instruction. The second video player interface may be construed as a page for displaying a trending video.

Illustratively, the electronic device displays the trending list on the first video player interface and displays multiple video properties in the trending list. When wanting to view the trending video corresponding to a video property, the user clicks the video property. Accordingly, when detecting that the user clicks the video property, the electronic device determines that the first trigger instruction is received, switches the current interface from the first video player interface to the second video player interface, and plays, on the second video player interface, the trending video corresponding to the video property clicked by the user.

In S205, in response to receiving a third slide instruction on the second video player interface, the trending video played on the second video player interface is switched according to the order of video properties of the trending list, and the instruction is ended.

The third slide instruction may be used for instructing the electronic device to switch the trending video played on the second video player interface. The third slide instruction may be an upward or downward slide instruction on the second video player interface. When the third slide instruction is upward, the electronic device may be instructed to play the next trending video (or the previous trending video). When the third slide instruction is downward, the electronic device may be instructed to play the previous trending video (or the next trending video). The next trending video may be construed as the trending video corresponding to the next video property of the video property of the trending video currently played on the second video player interface. The previous trending video may be construed as the trending video corresponding to the previous video property of the video property of the trending video currently played on the second video player interface.

By way of example, the user can instruct the electronic device to play the next trending video when sliding upward in the second video paly page and can instruct the electronic device to play the previous trending video when sliding downward in the second video paly page, and the electronic device plays a trending video on the second video player interface. In this case, when wanting to switch the trending video played on the second video player interface to the next trending video, the user slides upward in the second video paly page; and when wanting to switch the trending video played on the second video player interface to the previous trending video, the user slides downward in the second video paly page. Accordingly, when detecting that the user slides upward, the electronic device determines that the third slide instruction is received and switches the trending video played on the second video player interface to the next trending video; and when detecting that the user slides downward, the electronic device determines that the third slide instruction is received and switches the trending video played on the second video player interface to the previous trending video.

In S206, in response to receiving a second trigger instruction for displaying a control window of the trending list, the control window of the trending list is displayed, a Private Message control of at least one buddy and a No Interest control in the control window are displayed, and S207 or S208 is performed.

The second trigger instruction may instruct the electronic device to display the control window of the trending list. The second trigger instruction may be, for example, a long press on the first video player interface or a click on a control window entry displayed on the first video player interface.

Figure 6:
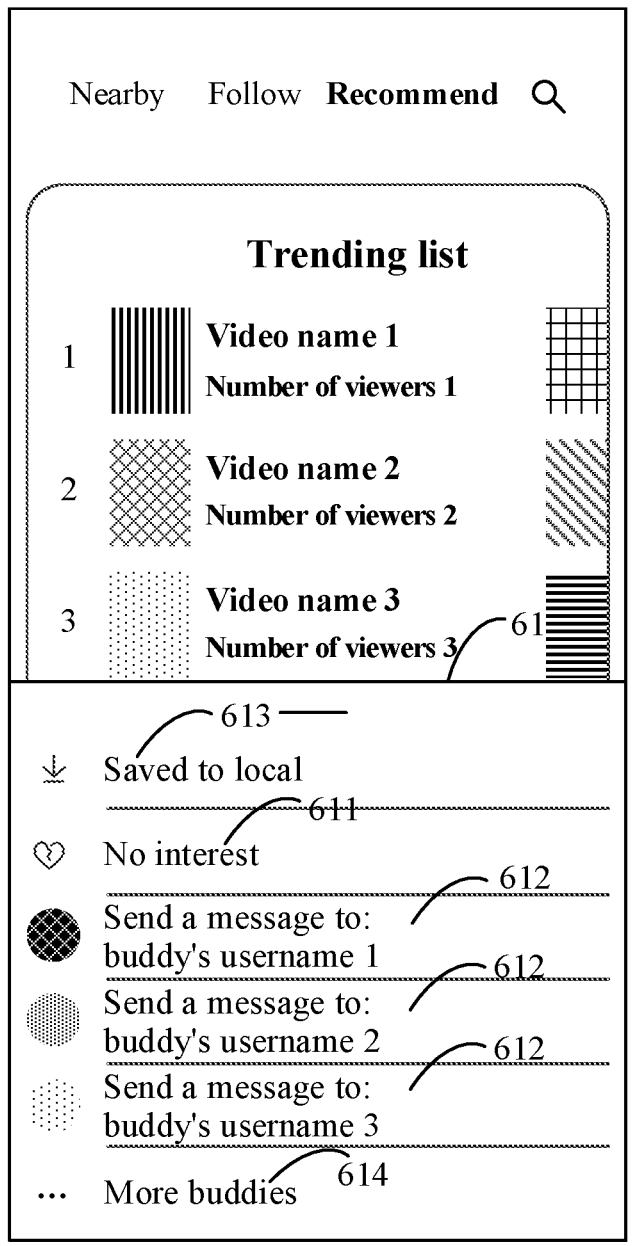
FIG. 6 is a diagram of a control window of a trending list according to an embodiment of the present disclosure.

Referring to FIG. 6, the control window 61 of the trending list may display a control for controlling the trending list, for example, a No Interest control 611 and a Private Message control 612 of at least one buddy. Additionally, the control window 61 of the trending list may also display a Saved to Local control 613 for instructing the electronic device to save the trending list to local; and a More Buddies control 614 for instructing the electronic device to display the user's buddy list. Thus, when wanting to save the trending list locally in the electronic device, the user may click the Saved to Local control 613 displayed in the control window 61. Accordingly, when detecting that the user clicks the Saved to Local control 613, the electronic device saves, locally in the electronic device, the trending list displayed on the first video player interface. When wanting to send the trending list to other buddies whose Private Message controls are not displayed in the control window 61 or wanting to send the trending list to a batch of buddies, the user may click the More Buddies control 614 displayed in the control window 61. Accordingly, when detecting that the user clicks the More Buddies control 614, the electronic device may display a private buddy selection page and display the user's buddy list in the private buddy selection page. Thereby, the user may select, from the buddy list, a buddy to which the user wants to send the trending list and may click a Send control in the private buddy selection page after the selection is completed. Accordingly, when detecting that the user clicks the Send control, the electronic device may send the trending list displayed on the first video player interface to the buddy selected by the user.

By way of example, the second trigger instruction is a long press on the first video player interface, and the electronic device displays the trending list on the first video player interface. In this case, when wanting to trigger a control in the control window of the trending list, the user long presses the first video player interface. Accordingly, when detecting the long press on the first video player interface, the electronic device determines that the second trigger instruction is received, displays the control window of the trending list, and displays a Private Message control of at least one buddy and a No Interest control in the control window.

In S207, in response to receiving a first click instruction on the No Interest control, the trending list is deleted from the video stream of the first video player interface, the next video in the video stream is played, and the instruction is ended.

The first click instruction may be construed as a click on the No Interest control in the control window of the trending list. When triggered, the No Interest control can instruct the electronic device to delete the trending list from the video stream of the first video player interface.

When the user is not interested in the trending list displayed on the first video player interface, the user may long press the first video player interface to instruct the electronic device to pop up the control window of the trending list and click the No Interest control in the control window. Accordingly, when detecting the click on the No Interest control in the control window of the trending list, the electronic device determines that the first click instruction is received, deletes the trending list from the video stream of the first video player interface, plays the next video of the target video in the video stream of the first video player interface, and may send a push reduction request to the server to request the server to reduce the number of times the trending list is pushed to the user or request the server to stop pushing the trending list to the user.

In S208, in response to receiving a second click instruction on a Private Message control of a target buddy, the trending list is sent to the target buddy, where the target buddy corresponds to the Private Message control clicked through the second click instruction.

The second click instruction may be construed as a click on the Private Message control corresponding to a buddy in the control window of the trending list. Accordingly, the target buddy is the buddy corresponding to the Private Message control clicked by the user. When triggered, the Private Message control can instruct the electronic device to send the trending list to the buddy corresponding to the Private Message control.

When wanting to send the trending list displayed on the first video player interface to a buddy, the user may long press the first video player interface to instruct the electronic device to pop up the control window of the trending list and may click, in the control window of the trending list, the Private Message control of the buddy to whom the user wants to send the trending list. Accordingly, when detecting the click on the Private Message control of the buddy in the control window of the trending list, the electronic device determines that the second click instruction is received and sends the trending list displayed on the first video player interface to the buddy corresponding to the Private Message control clicked by the second click instruction.

In the trending list display method of this embodiment, a trending video in the trending list can be played and switched so that the user can select and view a trending video in a targeted manner. Moreover, the trending list can be sent and deleted, and switching of a list page of the trending list can be reminded so that the user experience can be improved.

Figure 7:
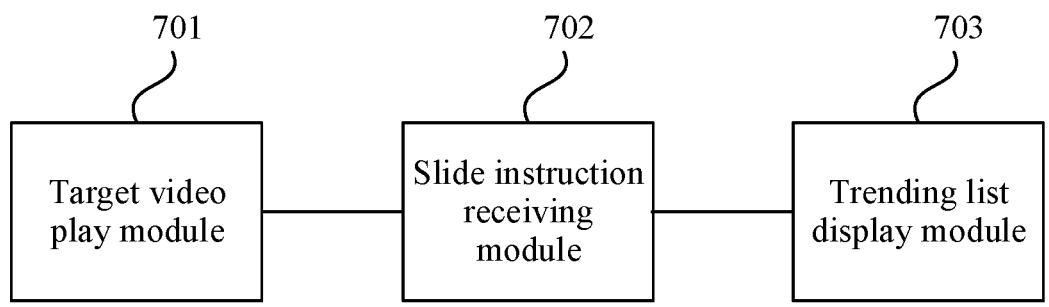
FIG. 7 is a block diagram of a trending list display apparatus according to an embodiment of the present disclosure.

FIG. 7 is a block diagram of a trending list display apparatus according to an embodiment of the present disclosure. The apparatus may be implemented in software and/or hardware and may be configured in an electronic device such as a mobile phone or a tablet computer. The apparatus may perform a trending list display method to display a trending list. As shown in FIG. 7, the trending list display apparatus of this embodiment may include a target video play module 701, a slide instruction receiving module 702, and a trending list display module 703.

The target video play module 701 is configured to play a target video in a first video player interface. The slide instruction receiving module 702 is configured to receive a first slide instruction on the first video player interface, where the first slide instruction is used for switching the current content of the first video player interface. The trending list display module 703 is configured to, in response to the first slide instruction satisfying a trigger condition for displaying a trending list, play a preset video of the trending list on the first video player interface, display the trending list in a layer on the preset video, and display video properties of multiple trending videos in the trending list.

In the trending list display apparatus of this embodiment, the target video play module is configured to play a target video in a first video player interface; the slide instruction receiving module is configured to receive a first slide instruction on the first video player interface, where the first slide instruction is used for switching the current content of the first video player interface; and the trending list display module is configured to, in response to the first slide instruction satisfying a trigger condition for displaying a trending list, play a preset video of the trending list on the first video player interface, display the trending list in a layer on the preset video, and display video properties of multiple trending videos in the trending list. In the solution of this embodiment, the trending list is displayed when a user switches a video, and the preset video is played in a layer under the trending list. The trending list is displayed so that the user can learn about information about trending videos and pay more attention to trending videos. Moreover, the first slide instruction enables video switching so that the trending list can be displayed in a pleasant manner, and the user experience can be improved.

In this solution, each video frame of the preset video contains a blurred area, and the display position of the blurred area on the first video player interface is the same as the display position of the trending list on the first video player interface.

In this solution, the trending list includes multiple list pages, and the trending list display module 703 is configured to, when the current condition satisfies the display condition of the trending list, display the trending list on the first video player interface, completely display, in a first display area of the trending list, multiple current video properties on the current list page and partially display, in a second display area of the trending list, multiple next video properties on the next list page.

The trending list display apparatus of this embodiment may also include a list page switching module. The list page switching module is configured to, in response to receiving a second slide instruction on the trending list, switch the current list page of the trending list by moving the multiple current video properties and the multiple next video properties along the slide direction of the target slide instruction; or, in response to receiving a click instruction on a video property update control in the trending list, switch the current list page of the trending list.

The trending list display apparatus of this embodiment may also include a screen dimension acquisition module and a video property determination module. The screen dimension acquisition module is configured to acquire screen dimension information of an electronic device before video properties of the multiple trending videos are displayed in the trending list. The video property determination module is configured to determine a target number of to-be-displayed video properties on each list page of the trending list according to the screen dimension information and determine the to-be-displayed video properties on each list page according to the target number.

The trending list display apparatus of this embodiment may also include a trending video play module. The trending video play module is configured to, in response to receiving a first trigger instruction on a video property in the trending list, switch the current interface from the first video player interface to a second video player interface and play a trending video corresponding to the first trigger instruction on the second video player interface.

The trending list display apparatus of this embodiment may also include a trending video switching module. The trending video switching module is configured to, in response to receiving a third slide instruction on the second video player interface, switch, according to the order of video properties of the trending list, the trending video played on the second video player interface.

The trending list display apparatus of this embodiment may also include a control window display module, a trending list deletion module, and a trending list sending module. The control window display module is configured to, in response to receiving a second trigger instruction for displaying a control window of the trending list, display the control window of the trending list and display a Private Message control of at least one buddy and a No Interest control in the control window. The trending list deletion module is configured to, in response to receiving a first click instruction on the No Interest control, delete the trending list from the video stream of the first video player interface and play the next video in the video stream. The trending list sending module is configured to, in response to receiving a second click instruction on a Private Message control of a target buddy of the at least one buddy, send the trending list to the target buddy, where the target buddy corresponds to the Private Message control clicked through the second click instruction.

The trending list display apparatus of this embodiment may also include a display condition determination module. The display condition determination module is configured to, in response to determining that the first slide instruction is the ith first slide instruction in a preset time period or that the next to-be-displayed content located in the video stream of the first video player interface and corresponding to the first slide instruction is the trending list, determine that the first slide instruction satisfies the trigger condition for displaying the trending list, where i is a positive integer.

The trending list display apparatus of this embodiment may also include a list display stop module. The list display stop module is configured to, in response to receiving the first slide instruction again, stopping displaying the trending list and displaying, on the first video player interface, a video located in the video stream and corresponding to the first slide instruction received again.

The trending list display apparatus of this embodiment of the present disclosure can perform the trending list display method of any embodiment of the present disclosure and has function modules and effects corresponding to the performed method. For technical details not described in detail in this embodiment, see the trending list display method of any embodiment of the present disclosure.

Figure 8:
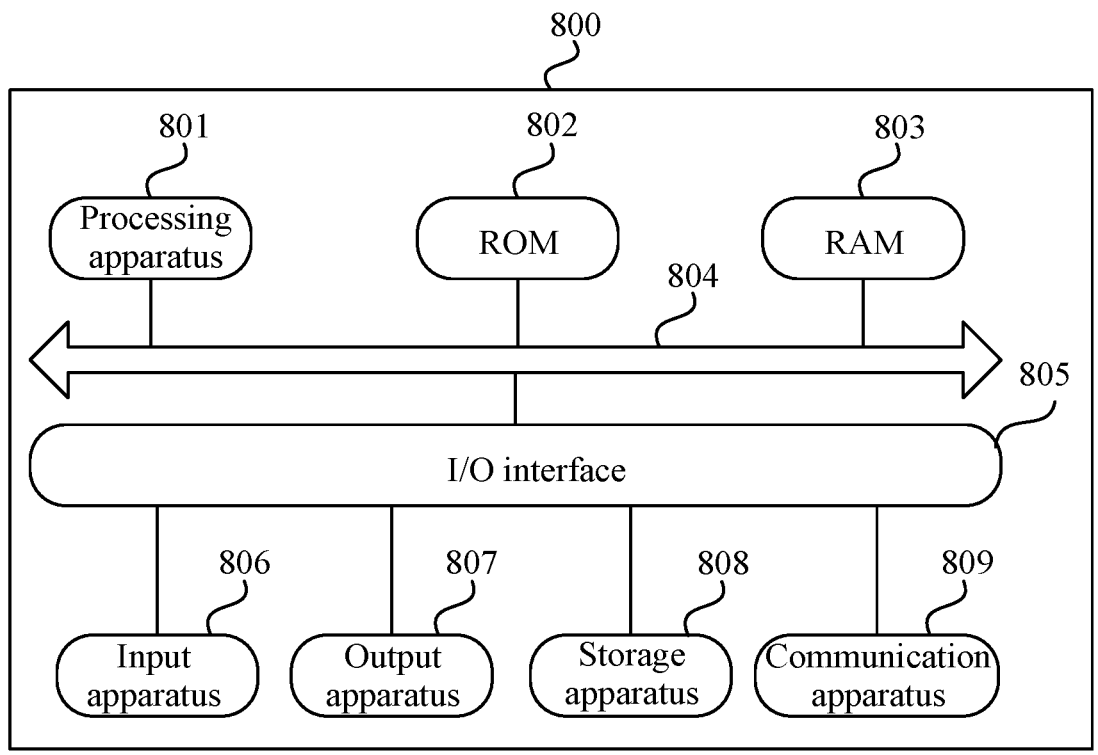
FIG. 8 is a diagram illustrating the structure of an electronic device according to an embodiment of the present disclosure.

FIG. 8 is a diagram illustrating the structure of an electronic device (for example, a terminal device) 800 for implementing any embodiment of the present disclosure.

The terminal device in the embodiments of the present disclosure may include, but is not limited to, a mobile terminal such as a mobile phone, a laptop, a digital broadcast receiver, a personal digital assistant (PDA), a portable Android device (PAD), a portable media player (PMP) and an in-vehicle terminal (such as an in-vehicle navigation terminal) and a stationary terminal such as a digital television (TV) and a desktop computer. The electronic device shown in FIG. 8 is an example and is not intended to limit the function and use range of this embodiment of the present disclosure.

As shown in FIG. 8, the electronic device 800 may include a processing apparatus (such as a central processing unit and a graphics processing unit) 801. The processing apparatus 802 may execute multiple appropriate actions and processing according to a program stored in a read-only memory (ROM) 802 or a program loaded into a random-access memory (RAM) 803 from a storage apparatus 808. The RAM 803 also stores various programs and data required for the instruction of the electronic device 800. The processing apparatus 801, the ROM 802 and the RAM 803 are connected to each other through a bus 804. An input/output (I/O) interface 805 is also connected to the bus 804.

Generally, the following apparatuses may be connected to the I/O interface 805: an input apparatus 806 such as a touch screen, a touch pad, a keyboard, a mouse, a camera, a microphone, an accelerometer and a gyroscope; an output apparatus 807 such as a liquid crystal display (LCD), a speaker and a vibrator; the storage apparatus 808 such as a magnetic tape and a hard disk; and a communication apparatus 809. The communication apparatus 809 may allow the electronic device 800 to perform wireless or wired communication with other devices to exchange data. FIG. 8 shows the electronic device 800 having various apparatuses, but it is not necessary to implement or be equipped all the shown apparatuses. Alternatively, more or fewer apparatuses may be implemented or present.

According to the embodiments of the present disclosure, the process described above with reference to a flowchart may be implemented as a computer software program. For example, a computer program product is included in embodiments of the present disclosure. The computer program product includes a computer program carried in a non-transitory computer-readable medium. The computer program includes program codes for executing the method shown in the flowchart. In such an embodiment, the computer program may be downloaded from a network and installed through the communication apparatus 809, or may be installed from the storage apparatus 808, or may be installed from the ROM 802. When the computer program is executed by the processing apparatus 801, the preceding functions defined in the method of the embodiments of the present disclosure are executed.

The computer-readable medium described above in the present disclosure may be a computer-readable signal medium or a computer-readable storage medium or any combination thereof. The computer-readable storage medium may be, but is not limited to, for example, an electronic, magnetic, optical, electromagnetic, infrared or semiconductor system, apparatus or device, or any combination thereof. An example of the computer-readable storage medium may include, but is not limited to, an electrical connection having one or more wires, a portable computer magnetic disk, a hard disk, a RAM, a ROM, an erasable programmable read-only memory (EPROM), a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal or any suitable combination thereof. The computer-readable signal medium may further be any computer-readable medium other than the computer-readable storage medium. The computer-readable signal medium may send, propagate, or transmit a program used by or used in conjunction with an instruction execution system, apparatus or device. The program codes included in the computer-readable medium may be transmitted in any suitable medium, including, but not limited to, a wire, an optical cable, a radio frequency (RF), or any suitable combination thereof.

In some embodiments, clients and servers may communicate using any currently known or future developed network protocol, such as the Hypertext Transfer Protocol (HTTP), and may be interconnected with any form or medium of digital data communication (for example, a communication network). Examples of the communication network include a local area network (LAN), a wide area networks (WAN), an internet (for example, the Internet), a peer-to-peer network (for example, an Ad-Hoc network), and any network currently known or to be developed in the future.

The computer-readable medium may be included in the electronic device or may exist alone without being assembled into the electronic device.

The computer-readable medium carries one or more programs. When the one or more programs are executed by the electronic device, the electronic device performs the following instructions: displaying a target video in a first video player interface; receiving a first slide instruction on the first video player interface, where the first slide instruction is used for switching current content of the first video player interface; and in response to the first slide instruction satisfying a trigger condition for displaying a trending list, displaying a preset video of the trending list on the first video player interface, displaying the trending list in a layer on the preset video, and displaying video properties of multiple trending videos in the trending list.

Computer program codes for executing the instructions in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. Program codes may be executed entirely on a user computer, executed partly on a user computer, executed as a stand-alone software package, executed partly on a user computer and partly on a remote computer, or executed entirely on a remote computer or a server. In the case involving the remote computer, the remote computer may be connected to the user computer through any type of network including a LAN or a WAN, or may be connected to an external computer (for example, via the Internet through an Internet service provider).

The flowcharts and block diagrams in the drawings show possible architectures, functions and instructions of the system, method and computer program product according to multiple embodiments of the present disclosure. In this regard, each block in the flowcharts or block diagrams may represent a module, a program segment, or part of codes that contains one or more executable instructions for implementing specified logical functions. In some embodiments, the functions noted in the blocks may be performed in an order different from that noted in the drawings. For example, two successive blocks may, in fact, be executed substantially in parallel or in a reverse order, depending on the functions involved. It is also to be noted that each block in the block diagrams and/or flowcharts and a combination of blocks in the block diagrams and/or flowcharts may be implemented by a special-purpose hardware-based system which performs specified functions or instructions or a combination of special-purpose hardware and computer instructions.

The units involved in the embodiments of the present disclosure may be implemented by software or hardware. The name of a module is not intended to limit the unit itself in some circumstance.

The functions described above herein may be executed, at least partially, by one or more hardware logic components. For example, without limitation, exemplary types of hardware logic components that may be used include a field programmable gate array (FPGA), an application-specific integrated circuit (ASIC), application-specific standard parts (ASSP), a system on a chip (SOC), a complex programmable logic device (CPLD) and the like.

In the context of the present disclosure, a machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Examples of the machine-readable storage medium may include an electrical connection based on one or more wires, a portable computer disk, a hard disk, a RAM, a ROM, an EPROM, a flash memory, an optical fiber, a CD-ROM, an optical storage device, a magnetic storage device, or any suitable combination thereof.

According to one or more embodiments of the present disclosure, example one provides a trending list display method. The trending list display method includes displaying a target video in a first video player interface; receiving a first slide instruction on the first video player interface, where the first slide instruction is used for switching current content of the first video player interface; and in response to the first slide instruction satisfying a trigger condition for displaying a trending list, displaying a preset video of the trending list on the first video player interface, displaying the trending list in a layer on the preset video, and displaying video properties of multiple trending videos in the trending list.

According to one or more embodiments of the present disclosure, in example two based on example one, each video frame of the preset video contains a blurred area, and the display position of the blurred area on the first video player interface is the same as the display position of the trending list on the first video player interface.

According to one or more embodiments of the present disclosure, in example three based on example two, the trending list includes multiple list pages, and displaying video properties of the multiple trending videos in the trending list includes completely displaying, in a first display area of the trending list, multiple current video properties on the current list page and partially displaying, in a second display area of the trending list, multiple next video properties on the next list page.

According to one or more embodiments of the present disclosure, in example four based on example three, the method also includes, in response to receiving a second slide instruction on the trending list, switching the current list page of the trending list by moving the multiple current video properties and the multiple next video properties along the slide direction of the target slide instruction; or, in response to receiving a click instruction on a video property update control in the trending list, switching the current list page of the trending list.

According to one or more embodiments of the present disclosure, in example five based on example three, before displaying video properties of the multiple trending videos in the trending list, the method also includes acquiring screen dimension information of an electronic device; and determining a target number of to-be-displayed video properties on each list page of the trending list according to the screen dimension information and determining the to-be-displayed video properties on each list page according to the target number.

According to one or more embodiments of the present disclosure, in example six based on the method of any one of examples one to five, the method also includes, in response to receiving a first trigger instruction on a video property in the trending list, switching the current interface from the first video player interface to a second video player interface and displaying a trending video corresponding to the first trigger instruction on the second video player interface.

According to one or more embodiments of the present disclosure, in example seven based on example six, the method also includes, in response to receiving a third slide instruction on the second video player interface, switching, according to the order of video properties of the trending list, the trending video played on the second video player interface.

According to one or more embodiments of the present disclosure, in example eight based on the method of any one of examples one to five, the method also includes, in response to receiving a second trigger instruction for displaying a control window of the trending list, displaying the control window of the trending list and displaying a Private Message control of at least one buddy and a No Interest control in the control window; in response to receiving a first click instruction on the No Interest control, deleting the trending list from the video stream of the first video player interface and displaying the next video in the video stream; and in response to receiving a second click instruction on a Private Message control of a target buddy, sending the trending list to the target buddy, where the target buddy corresponds to the Private Message control clicked through the second click instruction.

According to one or more embodiments of the present disclosure, in example nine based on the method of any one of examples one to five, the method also includes, in response to determining that the first slide instruction is the ith first slide instruction in a preset time period or that the next to-be-displayed content located in the video stream of the first video player interface and corresponding to the first slide instruction is the trending list, determining that the first slide instruction satisfies the trigger condition for displaying the trending list, where i is a positive integer.

According to one or more embodiments of the present disclosure, in example ten based on example nine, the method also includes, in response to receiving the first slide instruction again, stopping displaying the trending list and displaying, on the first video player interface, a video located in the video stream and corresponding to the first slide instruction received again.

According to one or more embodiments of the present disclosure, example eleven provides a trending list display apparatus. The apparatus includes a target video play module, a slide instruction receiving module, and a trending list display module.

The target video play module is configured to play a target video in a first video player interface. The slide instruction receiving module is configured to receive a first slide instruction on the first video player interface, where the first slide instruction is used for switching the current content of the first video player interface. The trending list display module is configured to, in response to the first slide instruction satisfying a trigger condition for displaying a trending list, play a preset video of the trending list on the first video player interface, display the trending list in a layer on the preset video, and display video properties of multiple trending videos in the trending list.

According to one or more embodiments of the present disclosure, example twelve provides an electronic device. The electronic device includes at least one processor and a memory configured to store at least one program. The at least one processor is configured to perform the trending list display method of any one of examples one to ten when executing the at least one program.

According to one or more embodiments of the present disclosure, example thirteen provides a computer-readable storage medium. The storage medium stores a computer program which, when executed by a processor, causes the processor to perform the trending list display method of any one of examples one to ten.

Additionally, although multiple instructions are depicted in a particular order, this should not be construed as requiring that such instructions should be performed in the shown particular order or in a sequential order. In certain circumstances, multitasking and parallel processing may be advantageous. Similarly, although implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable subcombination.

What is claimed is:

1. A trending list display method, comprising:
displaying a target video in a first video player interface;
receiving a first slide instruction on the first video player interface, wherein the first slide instruction is used for switching current content in the first video player interface; and
in response to the first slide instruction satisfying a trigger condition for displaying a trending list, displaying a preset video of the trending list on the first video player interface, displaying the trending list in a layer on the preset video, and displaying video properties of a plurality of trending videos in the trending list, wherein the video properties are video information of the trending videos, and the video properties comprise at least one of the following: popularity ranks of the trending videos, cover pages of the trending videos, video names of the trending videos, or a number of people who are viewing each of the trending videos, wherein the trending list comprises a plurality of list pages, and displaying the video properties of the plurality of trending videos in the trending list comprises:

completely displaying, in a first display area of the trending list, a plurality of current video properties on a current list page of the plurality of list pages and partially displaying, in a second display area of the trending list, a plurality of next video properties on a next list page of the plurality of list pages, wherein the method further comprises:

in response to determining that the first slide instruction is an ith first slide operation in a preset time period, inserting the trending list between the target video and a next video of the target video in addition to displaying the trending list in the layer on the preset video.

2. The method of claim 1, wherein each video frame of the preset video contains a blurred area, and a display position of the blurred area on the first video player interface is the same as a display position of the trending list on the first video player interface.

3. The method of claim 1, further comprising:

in response to receiving a second slide instruction on the trending list, control the plurality of current video properties and the plurality of next video properties to move along a slide direction of the second slide instruction to switch the current list page of the trending list; or in response to receiving a click instruction on a video property update control in the trending list, switching the current list page of the trending list.

4. The method of claim 1, before displaying the video properties of the plurality of trending videos in the trending list, the method further comprising:

acquiring screen dimension information of an electronic device; and determining a target number of to-be-displayed video properties on each of the plurality of list pages of the trending list according to the screen dimension information and determining the to-be-displayed video properties on the each of the plurality of list pages according to the target number.

5. The method of claim 1, further comprising:

in response to receiving a trigger instruction on a video property of the video properties of the trending list, switching a current interface from the first video player interface to a second video player interface and displaying a trending video corresponding to the trigger instruction on the second video player interface.

6. The method of claim 2, further comprising:

in response to receiving a trigger instruction on a video property of the video properties of the trending list, switching a current interface from the first video player interface to a second video player interface and displaying a trending video corresponding to the trigger instruction on the second video player interface.

7. The method of claim 1, further comprising:

in response to receiving a trigger instruction on a video property of the video properties of the trending list, switching a current interface from the first video player interface to a second video player interface and displaying a trending video corresponding to the trigger instruction on the second video player interface.

8. The method of claim 3, further comprising:

in response to receiving a trigger instruction on a video property of the video properties of the trending list, switching a current interface from the first video player interface to a second video player interface and displaying a trending video corresponding to the trigger instruction on the second video player interface.

9. The method of claim 4, further comprising:

in response to receiving a trigger instruction on a video property of the video properties of the trending list, switching a current interface from the first video player interface to a second video player interface and displaying a trending video corresponding to the trigger instruction on the second video player interface.

10. The method of claim 5, further comprising:

in response to receiving a third slide instruction on the second video player interface, switching, according to an order of the video properties in the trending list, the trending video played on the second video player interface.

11. The method of claim 1, further comprising:

in response to receiving a trigger instruction for displaying a control window of the trending list, displaying the control window of the trending list and displaying a No Interest control in the control window;

in response to receiving a click instruction on the No Interest control, deleting the trending list from a video stream of the first video player interface and displaying a next video in the video stream.

12. The method of claim 8, further comprising:

in response to receiving the first slide instruction again, stopping displaying the trending list and displaying, on the first video player interface, a video located in the video stream and corresponding to the first slide instruction received again.

13. An electronic device, comprising:

at least one processor; and a memory configured to store at least one program, wherein the at least one processor is configured to, when executing the at least one program, perform the following steps:

displaying a target video in a first video player interface;

receiving a first slide instruction on the first video player interface, wherein the first slide instruction is used for switching current content of the first video player interface; and in response to the first slide instruction satisfying a trigger condition for displaying a trending list, displaying a preset video of the trending list on the first video player interface, displaying the trending list in a layer on the preset video, and displaying video properties of a plurality of trending videos in the trending list, wherein the video properties are video information of the trending videos, and the video properties comprise at least one of the following: popularity ranks of the trending videos, cover pages of the trending videos, video names of the trending videos, or a number of people who are viewing each of the trending videos, wherein the trending list comprises a plurality of list pages, and displaying the video properties of the plurality of trending videos in the trending list comprises:

completely displaying, in a first display area of the trending list, a plurality of current video properties on a current list page of the plurality of list pages and partially displaying, in a second display area of the trending list, a plurality of next video properties on a next list page of the plurality of list pages, wherein the at least one processor is further configured to, when executing the at least one program, perform the following step:

in response to determining that the first slide instruction is an ith first slide operation in a preset time period, inserting the trending list between the target video and a next video of the target video in addition to displaying the trending list in the layer on the preset video.

14. A non-transitory computer-readable storage medium storing a computer program which, when executed by a processor, causes the processor to perform the following steps:

displaying a target video in a first video player interface;

receiving a first slide instruction on the first video player interface, wherein the first slide instruction is used for switching current content of the first video player interface; and in response to the first slide instruction satisfying a trigger condition for displaying a trending list, displaying a preset video of the trending list on the first video player interface, displaying the trending list in a layer on the preset video, and displaying video properties of a plurality of trending videos in the trending list, wherein the video properties are video information of the trending videos, and the video properties comprise at least one of the following: popularity ranks of the trending videos, cover pages of the trending videos, video names of the trending videos, or a number of people who are viewing each of the trending videos, wherein the trending list comprises a plurality of list pages, and displaying the video properties of the plurality of trending videos in the trending list comprises:

completely displaying, in a first display area of the trending list, a plurality of current video properties on a current list page of the plurality of list pages and partially displaying, in a second display area of the trending list, a plurality of next video properties on a next list page of the plurality of list pages, wherein the processor is further caused to perform the following step:

in response to determining that the first slide instruction is an ith first slide operation in a preset time period, inserting the trending list between the target video and a next video of the target video in addition to displaying the trending list in the layer on the preset video.

\* \* \* \* \*